(12) United States Patent
Wu et al.

(10) Patent No.: US 12,348,340 B2
(45) Date of Patent: Jul. 1, 2025

(54) EQUALIZER SETTINGS FOR A RE-DRIVER

(71) Applicant: Intel Corporation, Santa Clara, CA (US)

(72) Inventors: Yang Wu, Shanghai (CN); Howard Heck, Tigard, OR (US); Jingbo Li, Portland, OR (US); Tao Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 18/010,779

(22) PCT Filed: Jul. 15, 2020

(86) PCT No.: PCT/CN2020/102047
§ 371 (c)(1),
(2) Date: Dec. 15, 2022

(87) PCT Pub. No.: WO2022/011586
PCT Pub. Date: Jan. 20, 2022

(65) Prior Publication Data
US 2023/0246888 A1    Aug. 3, 2023

(51) Int. Cl.
*H04L 25/03*    (2006.01)
(52) U.S. Cl.
CPC ............... *H04L 25/03878* (2013.01)
(58) Field of Classification Search
CPC ... H04L 25/02; H04L 25/03; H04L 25/03878; H04L 25/03885; H04L 25/026; H04L 25/20; H04L 25/24; H04L 25/242
See application file for complete search history.

(56) References Cited

U.S. PATENT DOCUMENTS

| | | | |
|---|---|---|---|
| 7,079,575 B2* | 7/2006 | Ho | H03L 7/0998 375/232 |
| 7,900,098 B2* | 3/2011 | Becker | H04L 25/05 324/76.11 |
| 7,986,159 B1* | 7/2011 | Ahmad | G06F 3/0676 326/38 |

(Continued)

FOREIGN PATENT DOCUMENTS

TW     201800955 A     1/2018

OTHER PUBLICATIONS

International Search Report and Written Opinion mailed Apr. 16, 2021 for International Application No. PCT/CN2020/102047, 9 pages.

(Continued)

*Primary Examiner* — James M Perez
(74) *Attorney, Agent, or Firm* — Schwabe, Williamson & Wyatt, P.C.

(57) ABSTRACT

Embodiments of the present disclosure may relate to a controller coupled to a re-driver, where the controller has one or more sensor ports to couple with sensor devices, with circuitry coupled with the sensor ports and a re-driver port to receive operational data from the sensor ports, and based on the received operational data identify an indication of a re-driver equalizer setting to be transmitted to the re-driver device. Embodiments are used to increase the stability of the re-driver and maintain link margins a crossed varied operational conditions of the re-driver. Other embodiments may be described and/or claimed.

19 Claims, 6 Drawing Sheets

(56) References Cited

U.S. PATENT DOCUMENTS

| | | | | |
|---|---|---|---|---|
| 8,391,436 | B2* | 3/2013 | Higeta | H04L 7/033 |
| | | | | 375/357 |
| 8,462,880 | B2* | 6/2013 | Lin | H04B 15/02 |
| | | | | 375/309 |
| 8,539,309 | B2* | 9/2013 | Blackmon | G06F 11/1443 |
| | | | | 714/763 |
| 8,675,714 | B2* | 3/2014 | Cheung | H04L 25/03878 |
| | | | | 379/348 |
| 8,804,792 | B1* | 8/2014 | Cheung | H04L 25/20 |
| | | | | 710/48 |
| 9,106,464 | B2* | 8/2015 | Cheung | H04L 25/03885 |
| 9,137,063 | B2* | 9/2015 | Zerbe | H04L 27/01 |
| 9,223,385 | B2* | 12/2015 | Chen | G06F 1/3253 |
| 9,264,267 | B2* | 2/2016 | Ran | C07C 51/265 |
| 9,329,623 | B2* | 5/2016 | Vankayala | H03L 7/16 |
| 9,337,993 | B1* | 5/2016 | Lugthart | H04L 27/38 |
| 9,544,864 | B1* | 1/2017 | Takahashi | H04W 56/0015 |
| 9,553,742 | B1* | 1/2017 | Xu | H04L 25/0384 |
| 9,559,905 | B2* | 1/2017 | Chen | H04L 41/0816 |
| 9,565,036 | B2* | 2/2017 | Zerbe | H04L 25/0264 |
| 9,602,315 | B2* | 3/2017 | Islam | H04L 25/06 |
| 9,692,589 | B2* | 6/2017 | Iyer | H04L 1/241 |
| 9,722,822 | B1* | 8/2017 | Zhang | H04L 25/03343 |
| 9,819,523 | B2* | 11/2017 | Lee | H04L 25/03878 |
| 9,882,748 | B2* | 1/2018 | Ran | C07C 63/26 |
| 9,959,222 | B2* | 5/2018 | Chen | G06F 13/4286 |
| 9,965,439 | B2* | 5/2018 | Das Sharma | G06F 13/4291 |
| 10,038,574 | B2* | 7/2018 | Islam | H04L 25/03885 |
| 10,108,577 | B2* | 10/2018 | Chen | G06F 13/4295 |
| 10,127,187 | B2* | 11/2018 | Chen | G06F 13/4291 |
| 10,158,339 | B2* | 12/2018 | Kong | G06F 13/382 |
| 10,223,324 | B2* | 3/2019 | Chen | G06F 13/4072 |
| 10,235,327 | B2* | 3/2019 | Chen | G06F 13/4072 |
| 10,291,275 | B2* | 5/2019 | Lee | H04B 1/24 |
| 10,305,495 | B2* | 5/2019 | Behel | H03L 7/06 |
| 10,419,200 | B2* | 9/2019 | Takahashi | H04L 7/0025 |
| 10,425,124 | B1* | 9/2019 | Wang | H04B 3/36 |
| 10,432,432 | B1* | 10/2019 | Liu | H04L 25/0272 |
| 10,606,793 | B2* | 3/2020 | Das Sharma | G06F 13/4068 |
| 10,691,150 | B1* | 6/2020 | Delshadpour | H03K 19/017581 |
| 10,747,688 | B2* | 8/2020 | Jen | G06F 13/4022 |
| 10,880,137 | B2* | 12/2020 | Das Sharma | H04L 27/01 |
| 10,911,052 | B2* | 2/2021 | Littmann | H04L 25/4917 |
| 10,924,307 | B1* | 2/2021 | Zhang | H03K 17/60 |
| 10,931,329 | B2* | 2/2021 | Shah | G06F 13/40 |
| 10,979,258 | B1* | 4/2021 | Chen | H04L 25/0272 |
| 11,005,692 | B2* | 5/2021 | Das Sharma | H04L 27/01 |
| 11,128,497 | B1* | 9/2021 | Sun | H04L 25/03267 |
| 11,177,986 | B1* | 11/2021 | Ganesan | H04L 25/03878 |
| 11,194,751 | B2* | 12/2021 | Chen | G06F 1/3278 |
| 11,206,161 | B1* | 12/2021 | Delshadpour | H04L 27/01 |
| 11,301,411 | B2* | 4/2022 | Harriman | G06F 13/387 |
| 11,467,999 | B2* | 10/2022 | Das Sharma | G06F 13/4068 |
| 11,533,205 | B2* | 12/2022 | Vining | H04L 25/03828 |
| 11,563,462 | B1* | 1/2023 | Rastogi | H03F 3/45179 |
| 11,573,920 | B2* | 2/2023 | Das Sharma | G06F 13/4022 |
| 11,588,610 | B2* | 2/2023 | Vrazel | H04L 7/0083 |
| 11,784,857 | B1* | 10/2023 | Delshadpour | H03F 3/45201 |
| | | | | 375/232 |
| 11,843,484 | B2* | 12/2023 | Vining | H04L 25/03885 |
| 12,143,168 | B2* | 11/2024 | Uematsu | H04B 3/46 |
| 12,184,455 | B2* | 12/2024 | Ganesan | H04L 25/03076 |
| 2003/0142738 | A1* | 7/2003 | Ho | H04L 25/03885 |
| | | | | 375/229 |
| 2004/0208521 | A1* | 10/2004 | Kaneko | H04B 10/25133 |
| | | | | 398/30 |
| 2006/0188043 | A1* | 8/2006 | Zerbe | H04L 27/01 |
| | | | | 375/233 |
| 2008/0292311 | A1* | 11/2008 | Daghighian | H04B 10/40 |
| | | | | 398/9 |
| 2011/0101998 | A1* | 5/2011 | Myers | G01R 31/2621 |
| | | | | 324/678 |
| 2012/0087405 | A1* | 4/2012 | Cheung | H04L 25/03885 |
| | | | | 375/232 |
| 2012/0311359 | A1* | 12/2012 | Jaramillo | H04L 25/0298 |
| | | | | 713/321 |
| 2013/0007489 | A1* | 1/2013 | Unnikrishnan | G06F 13/4282 |
| | | | | 713/320 |
| 2013/0073749 | A1* | 3/2013 | Tremblay | H04L 12/40032 |
| | | | | 710/16 |
| 2013/0089122 | A1* | 4/2013 | Lin | H04L 25/03885 |
| | | | | 375/219 |
| 2013/0142244 | A1* | 6/2013 | Tan | H04L 25/03159 |
| | | | | 375/232 |
| 2013/0156088 | A1* | 6/2013 | Jin | H04L 25/03885 |
| | | | | 375/232 |
| 2013/0170410 | A1* | 7/2013 | Nitzan | H04L 25/03878 |
| | | | | 370/296 |
| 2013/0329130 | A1* | 12/2013 | Gupta | H04N 5/21 |
| | | | | 348/497 |
| 2014/0092952 | A1* | 4/2014 | Aguilar-Arreola | |
| | | | | H04L 25/03878 |
| | | | | 375/233 |
| 2014/0173303 | A1* | 6/2014 | Chen | G06F 1/3253 |
| | | | | 713/310 |
| 2015/0319108 | A1* | 11/2015 | Maung | H04L 12/6418 |
| | | | | 370/359 |
| 2015/0363350 | A1* | 12/2015 | Yeung | G06F 13/4221 |
| | | | | 710/106 |
| 2016/0173299 | A1* | 6/2016 | Islam | H04L 25/06 |
| | | | | 375/232 |
| 2016/0191313 | A1* | 6/2016 | Chen | H04L 12/12 |
| | | | | 370/315 |
| 2016/0196233 | A1* | 7/2016 | Chen | G06F 13/4295 |
| | | | | 710/106 |
| 2016/0364244 | A1* | 12/2016 | Kumar | G06F 9/441 |
| 2017/0019247 | A1* | 1/2017 | Iyer | H04L 1/243 |
| 2017/0139866 | A1* | 5/2017 | Wallace | G06F 13/4027 |
| 2017/0170799 | A1* | 6/2017 | Kong | G06F 30/392 |
| 2017/0244581 | A1* | 8/2017 | Islam | H04L 25/06 |
| 2017/0286359 | A1* | 10/2017 | McGowan | G06F 13/4291 |
| 2018/0331864 | A1* | 11/2018 | Das Sharma | H04L 25/03 |
| 2019/0034376 | A1* | 1/2019 | Das Sharma | G06F 12/1009 |
| 2019/0042524 | A1* | 2/2019 | Das Sharma | G06F 13/4282 |
| 2019/0179553 | A1* | 6/2019 | Kim | H04L 25/03057 |
| 2019/0258600 | A1* | 8/2019 | Das Sharma | G06F 11/0778 |
| 2019/0286605 | A1* | 9/2019 | Harriman | G06F 13/387 |
| 2019/0305810 | A1* | 10/2019 | Pham | H04L 25/0272 |
| 2019/0340146 | A1* | 11/2019 | Chen | H03K 5/2481 |
| 2020/0007133 | A1* | 1/2020 | Littmann | H03L 7/0816 |
| 2020/0313940 | A1* | 10/2020 | Das Sharma | H04L 27/01 |
| 2020/0409444 | A1* | 12/2020 | Delshadpour | H04L 25/0298 |
| 2020/0412585 | A1* | 12/2020 | Ueta | H04L 25/03885 |
| 2021/0013924 | A1* | 1/2021 | Kliger | H04B 3/23 |
| 2021/0342288 | A1* | 11/2021 | Das Sharma | G06F 12/0238 |
| 2021/0399806 | A1* | 12/2021 | Bernier | H04B 10/0771 |
| 2022/0085967 | A1* | 3/2022 | Vrazel | H04L 7/033 |
| 2022/0094577 | A1* | 3/2022 | Vining | H04L 25/03885 |
| 2022/0123972 | A1* | 4/2022 | Chen | H04L 25/03866 |
| 2022/0166654 | A1* | 5/2022 | Bossard | H04L 27/04 |
| 2022/0197364 | A1* | 6/2022 | Gopalakrishnan | G06F 1/3253 |
| 2022/0286334 | A1* | 9/2022 | Cornelius | H04L 25/0272 |
| 2022/0414047 | A1* | 12/2022 | Das Sharma | G06F 13/4068 |
| 2023/0061303 | A1* | 3/2023 | Vining | H04L 25/03885 |
| 2023/0246884 | A1* | 8/2023 | Manian | H03F 3/45103 |
| | | | | 375/233 |
| 2023/0246888 | A1* | 8/2023 | Wu | H04L 25/03878 |
| | | | | 375/230 |
| 2023/0336383 | A1* | 10/2023 | Delshadpour | H03G 3/3036 |
| 2023/0412281 | A1* | 12/2023 | Das Sharma | H04B 10/516 |
| 2024/0146584 | A1* | 5/2024 | Ganesan | H04L 25/03885 |
| 2024/0171282 | A1* | 5/2024 | Kawai | H04J 14/02216 |

OTHER PUBLICATIONS

Search Report issued May 30, 2024 for TW Application No. 109141651, 2 pages.

* cited by examiner

| Re-driver silicon corner | CPU Temperature range | Inlet Air Flow Temperature range | ASIC Temperature range | Optimized re-driver equalizer setting |
|---|---|---|---|---|
| slow | 30~70° Celsius | 20~40° Celsius | 30~70° Celsius | Setting value 1 |
| slow | 80~110°Celsius | 20~40° Celsius | 30~70° Celsius | Setting value 2 |
| slow | 30~70° Celsius | 40~60° Celsius | 30~70° Celsius | Setting value 3 |
| slow | 80~110°Celsius | 40~60° Celsius | 30~70° Celsius | Setting value 4 |
| slow | 30~70° Celsius | 20~40° Celsius | 70~110° Celsius | Setting value 5 |
| slow | 80~110°Celsius | 20~40° Celsius | 70~110° Celsius | Setting value 6 |
| slow | 30~70° Celsius | 40~60° Celsius | 70~110° Celsius | Setting value 7 |
| slow | 80~110°Celsius | 40~60° Celsius | 70~110° Celsius | Setting value 8 |
| Typical | 30~70° Celsius | 20~40° Celsius | 30~70° Celsius | Setting value 9 |
| Typical | 80~110°Celsius | 20~40° Celsius | 30~70° Celsius | Setting value 10 |
| Typical | 30~70° Celsius | 40~60° Celsius | 30~70° Celsius | Setting value 11 |
| Typical | 80~110°Celsius | 40~60° Celsius | 30~70° Celsius | Setting value 12 |
| Typical | 30~70° Celsius | 20~40° Celsius | 70~110° Celsius | Setting value 13 |
| Typical | 80~110°Celsius | 20~40° Celsius | 70~110° Celsius | Setting value 14 |
| Typical | 30~70° Celsius | 40~60° Celsius | 70~110° Celsius | Setting value 15 |
| Typical | 80~110°Celsius | 40~60° Celsius | 70~110° Celsius | Setting value 16 |
| ... | ... | | | ... |

FIG. 3

EQUALIZER SETTINGS FOR A RE-DRIVER

CROSS REFERENCE TO RELATED APPLICATIONS

This application is a national phase entry under 35 U.S.C. § 371 of International Application No. PCT/CN2020/102047, filed Jul. 15, 2020, entitled "EQUALIZER SETTINGS FOR A RE-DRIVER," which designated, among the various States, the United States of America. The Specification of the PCT/CN2020/102047 application is hereby incorporated by reference in its entirety for all purposes, except for those sections, if any, that are inconsistent with this application.

TECHNICAL FIELD

Embodiments of the present disclosure generally relate to the field of interconnects, in particular to re-drivers used to boost the signal quality of high-speed interfaces.

BACKGROUND

A re-driver, which may also be known as a repeater Integrated Circuit (IC), regenerates signals to boost the signal quality of high-speed interfaces, which is expected to support speeds of 10 or more gigabits per second (Gb/s). Re-drivers may also be used to adjust and correct for known channel losses at a transmitter and restore signal integrity at a receiver.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 is an example of a lookup table within a controller that may be used to provide a re-driver with an optimized re-driver equalizer setting, in accordance with various embodiments.

DETAILED DESCRIPTION

Figure 1:
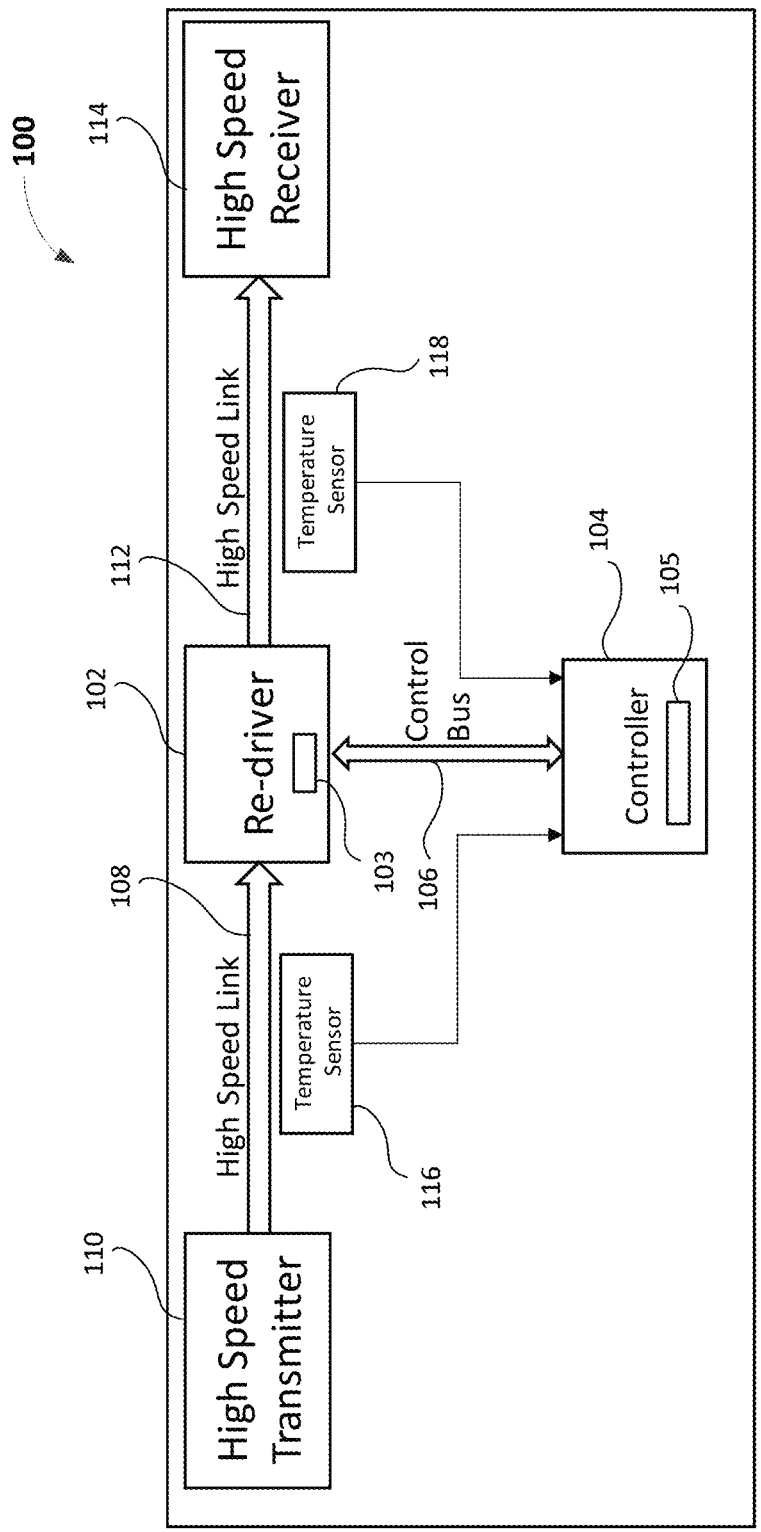
FIG. 1 depicts a communication link example of a re-driver with equalizer settings, in accordance with various embodiments.

Embodiments of the present disclosure may relate to a re-driver device that has an input port to receive a first signal and an output port to transmit a second signal. The first signal and the second signals may be high-speed signals, e.g., signal of 10+ Gb/s. The re-driver device may also include a controller port to couple with the controller device, and circuitry coupled to the input port, the output port, and the controller port to receive an indication of one of a plurality of re-driver equalizer settings from the controller device. The circuitry may also identify, based upon the received indication, one of a plurality of re-driver equalizer settings to send to the re-driver device to compensate for channel loss conditions associated with receiving the first signal.

Embodiments of the present disclosure may also relate to a controller device that has one or more sensor ports to couple with one or more sensor devices external to the controller, and a re-driver port to couple with the re-driver device to receive, from the one or more sensor devices operational data, and identify, based on the received operational data, an indication of a re-driver equalizer setting to be transmitted to the re-driver device.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 depicts a communication link example of a re-driver with equalizer settings, in accordance with various embodiments. Diagram 100 shows an example of a re-driver 102 that is coupled to a controller 104 via a control bus 106. The re-driver 102 may be coupled with a high-speed data link 108 on which high-speed data (e.g., 10+ Gb/s) is transmitted from a high-speed transmitter 110. During operation, the high-speed data along the high-speed link 108 may be subject to performance degradation due to a number of factors, which may include, for example, varying operating temperatures at varying locations within the system shown in diagram 100, and/or process variations (also referred to as silicon corners) of the re-driver 102. In embodiments, the re-driver 102 may be positioned near the middle of the high-speed links 108 and 112 to extend the physical reach between the high-speed transmitter 110 and the high-speed receiver 114. That is, the re-driver 102 is positioned to be approximately equidistant between the high-speed transmitter 110 and the high-speed receiver 114.

In embodiments, the re-driver 102 may be arranged to store an indication of a re-driver equalizer setting 103. In embodiments, the indication of the re-driver equalizer setting 103 may be stored in a read/write register within the circuitry of the re-driver 102. In embodiments, based upon the indication of the re-driver equalizer setting 103, the re-driver 102 may make adjustments to the high-speed signal on the high-speed link 108 and output the adjusted high-speed signal on a second high-speed link 112 that may be coupled with the high-speed receiver 114.

The controller 104 may be coupled with temperature sensors 116, 118 to receive data indicating a temperature proximate to the location of the temperature sensors 116, 118. In this example, the temperature sensors 116, 118 may be located, respectively, proximate to the high-speed links 108, 112, and determine increases or decreases in temperature based upon the activity on the respective high-speed links 108, 112. The temperature from the temperature sensors 116, 118 is received by the controller, and used in part to determine an indication of a re-driver equalizer setting 103 sent to the re-driver 102.

In embodiments, the controller 104 will take data received from the temperature sensors 116, 118, as well as data indicating re-driver 102 silicon process corners, and determine an appropriate indication of a re-driver equalizer setting 103 to be sent by the controller 104 to the re-driver 102 via the control bus 106. In this way, the controller 104 is in charge of adjustment for the re-driver equalizer setting 103 of the re-driver 102. In embodiments, the controller could be a Baseboard Management Controller (BMC) of a server, or a Field Programmable Gate Array (FPGA) or Complex Programmable Logic Device (CPLD) of a computing platform.

In embodiments, the controller 104 may include a mapping table 105, described further below, to map various characteristics of the re-driver 102 silicon corners along with various data ranges from various sensors 116, 118 to a re-driver equalizer setting 103. In embodiments discussed further below, the mapping table 105 may be implemented as a lookup table.

In embodiments, the control bus 106 may be an interconnect of a computing platform, as shown in diagram 100, that may couple the re-driver 102 and the controller 104. In embodiments, the interconnect may be low-speed interface such as an inter-integrated circuit (I2C) bus, or may be a Serial Peripheral Interface (SPI), or a Universal Asynchronous Receiver-Transmitter (UART) circuit. The re-driver 102 supports the control bus 106 to be able to read or write the re-driver equalizer setting 103.

In embodiments related to the system shown in diagram 100, the re-driver 102 may perform an equalizer function based upon the re-driver equalizer setting 103 that is chosen based upon current performance characteristics of the system of diagram 100 and the silicon corner of the re-driver 102. In this way, the re-driver 102 has a group of equalization setting values stored in the mapping table 105, that may be used to compensate different channel loss conditions along the high-speed link 108 based on varying conditions.

The re-driver 102, controller 104, and temperature sensors 116, 118 form, in embodiments, an automatic adjustment system for re-driver equalizer setting 103, adaptively modifying the re-driver equalizer setting 103 to compensate for performance deviation due to different silicon corners and channel loss change impact from variations of working temperatures, for example of the system of diagram 100. As a result, the stability of the re-driver 102 can be increased and link margins may be maintained across a range of variations. In addition, the re-driver 102 may be able to support longer channels than may be supported in traditional re-driver design, and save development resources and time on re-driver equalizer setting optimization.

In addition, embodiments described herein are protocol transparent, and support high speed link protocols, such as but not limited to, Peripheral Component Interconnect Express (PCIe), Universal Serial Bus (USB), and Serial Advanced Technology Attachment (SATA).

In legacy implementations, a re-driver would be given only one equalizer profile to apply to the high-speed data coming along high-speed link 108. The profile may be hard-coded into the re-driver chip. As a result, these legacy implementations may result in under compensation and overcompensation of signals over the high-speed link 108, which may both weaken the channel extension capability of the re-driver, and impact channel performance. In legacy implementations, re-driver equalizers are typically set to a fixed value within a given design. This fixed setting is suitable for a single condition of systems such as shown in diagram 100, leaving link margins vulnerable to variation in temperature and in silicon corners.

As an example, in legacy implementations, channel loss can vary by 20%-30% over a temperature range of 0 to 60 degrees Celsius, leading to performance degradation in the re-driver or even high-speed link failure. In addition, the performance of the legacy re-driver, as an analog circuit, depends heavily on the process variation or silicon corner of each manufactured re-driver. This can cause significant variation in re-driver equalizer behavior in legacy implementations.

In legacy implementations, the chosen re-driver equalizer setting is typically manually tuned for each re-driver, based on different expected operational temperatures and silicon corners. The resulting equalizer setting shows a balance that supported the legacy re-driver working properly for a full temperature range and all silicon corners. This legacy approach, however, does not scale well to 10+ gigabits per second (Gb/s) due to operation with reduced margins and to the fact that the margin loss across variation is a larger fraction of the total system margin. It becomes difficult in legacy implementations to find a balance re-driver equalizer setting that can accommodate varying temperature ranges and all silicon corners. Legacy fine-tuning the re-driver for a balance setting value also consumes a large amount of development time and resources and also lengthens the product development time.

Figure 2:
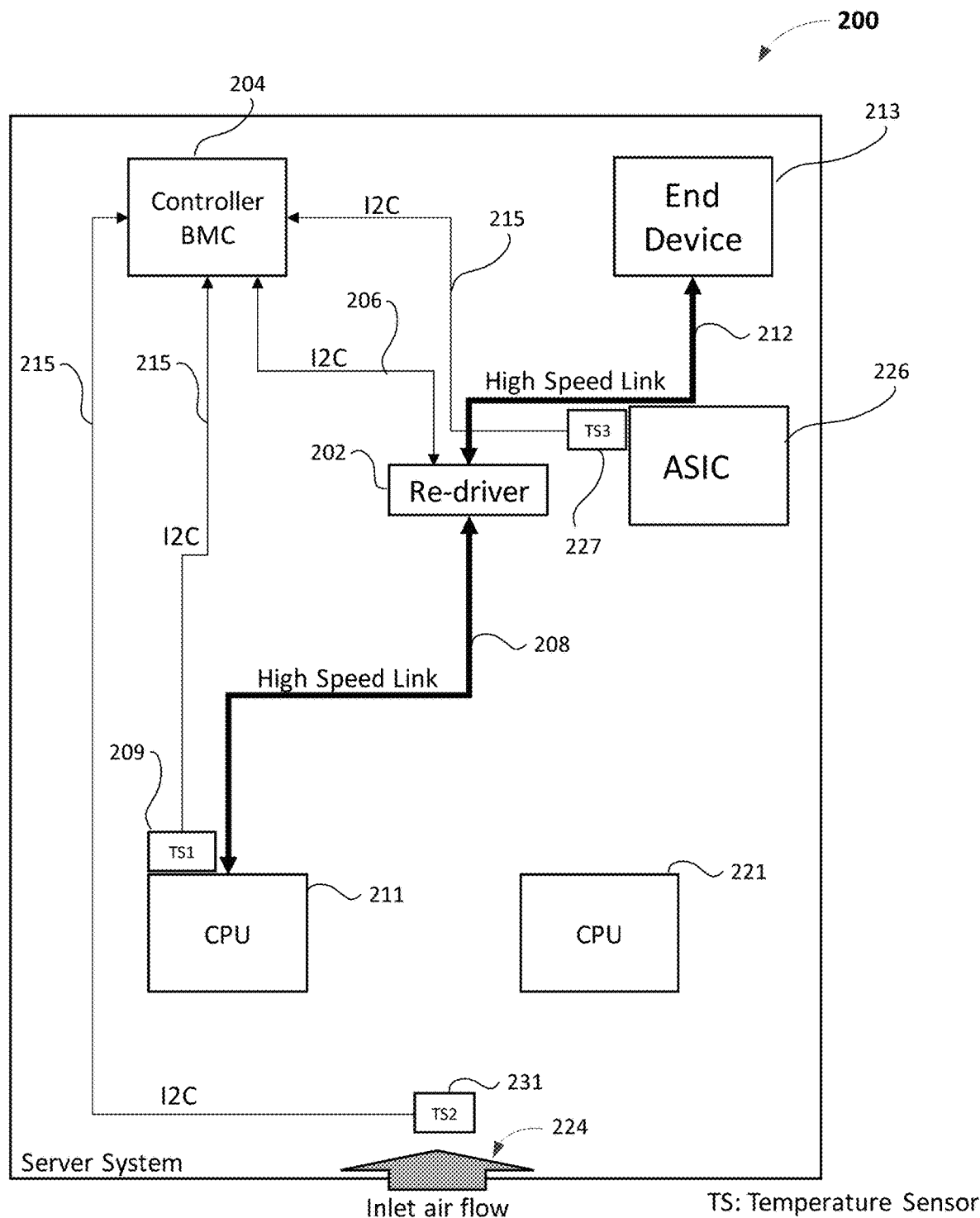
FIG. 2 depicts a server system example having a re-driver with equalizer settings coupled with a controller, in accordance with various embodiments.

FIG. 2 depicts a server system example having a re-driver with equalizer settings coupled with a controller, in accordance with various embodiments. In embodiments, server 200 may be a box or a rack component. Server 200 shows a controller BMC 204, which may be similar to controller 104 of FIG. 1, and re-driver 202 which may be similar to re-driver 102 of FIG. 1. The high-speed links 210, 212, which may be similar to high-speed links 108, 112 of FIG. 1, couple a Central Processing Unit (CPU) 211 and an End Device 213. Examples of End Device 213 may include, but are not limited to, a memory controller, a peripheral control hub, and so forth. In embodiments, the server system 200 may also include an inlet air flow 224 that may bring conditioned air into the server system 200 to cool various components during operation. In embodiments, an ASIC 226 is also coupled with the Controller BMC 204.

During design of the server system 200, designers may identify various sources of thermal variation in components during operation such as ASIC 226, CPU 211, and the air inlet flow 224, that may affect the performance of the re-driver 202 during operation. As a result, an ASIC temperature sensor 227, a CPU temperature sensor 209, and inlet air flow temperature sensor 231 are placed proximate to their respective components to identify temperature variations during operation at these locations. Each temperature sensor 227, 209, 231 are coupled to the controller BMC 204 using an I2C bus 215. The temperature sensor 227, 209, 231 may provide temperature data to the controller BMC 204 on a continuous basis.

With respect to temperature fluctuations of CPU 211, these fluctuations may be determined by CPU work status and power consumption. In operation, fluctuating CPU 211 temperature may not only impact the performance of high-speed circuits (not shown) inside the CPU, but may also influence trace loss proximate to the CPU. Temperature fluctuations of the airflow inlet 224, which may be part of a chassis (not shown) that surrounds the server system of diagram 200, will be determined by the cooling system servicing the server room. In embodiments, the cooled air may be a significant factor impacting the loss of passive printed circuit board (PCB) routing. The ASIC 226, which in embodiments may be some other type of high-powered chip or module, may also be a source of heat. If one segment of the high-speed link 212 is close to the ASIC 226, the loss of the high-speed link 202 will vary based on the temperature change of the ASIC 226.

The silicon corner information of each re-driver chip 202 may be tested for and evaluated during manufacturing of the re-driver 202. In embodiments, this silicon corner information may be recorded in the re-driver 202, for example in a register (not shown), that may be read by the controller 204 via the control bus 206.

In the example server 200, the high-speed link 212 is close to the high-powered ASIC 226, which will heavily impact the high-speed link 212 through degradation of the channel when the ASIC 226 is at a high temperature. There are other heat generating components within the server system 200 as well that may affect performance during operation. During development, different temperatures may be simulated by tuning the power loading of each component of the system, such as CPU 211 and ASIC 225, as well as varying the ambient temperature of the air received from the inlet airflow 224. As a result, in some embodiments, all possible temperature combinations of the different temperature sensors 209, 227, 231 will be tested. The high-speed link margin values for reliable operation will be determined at each temperature combination monitored during testing. If the resulting margin values are not good enough for the desired high-speed link performance, the re-driver equalizer setting will be tuned via a one by one sweep until a good link margin is found and this optimized equalizer re-driver setting will be added to the table. After temperature tuning is done for one re-driver silicon corner, the re-driver chip may be replaced with a different silicon corner chip, and the test may be repeated with the new silicon corner. After the tuning is finished, a final table will be created and saved in the controller 204.

FIG. 3 is an example of a lookup table within a controller that may be used to provide a re-driver with an optimized re-driver equalizer setting, in accordance with various embodiments. Table 300 may include a plurality of records 340 that may be stored in the mapping table 105 of FIG. 1. The table 300 may be stored within the controller 204 of FIG. 2. The columns 330, 332, 334, 336, 338 of table 300 map to various elements found with the server system 200 of FIG. 2. In particular, a value representing a re-driver silicon corner 300 maps to various silicon corners of re-driver 202. As shown, the values of a re-driver silicon corner may be mapped to either "slow" or "Typical." The CPU temperature range 332 maps to various temperature ranges of CPU 211 that may be captured by temperature sensor 209. The Inlet airflow temperature range 334 maps to various temperature ranges of intake airflow 224 that may be measured by temperature sensor 231. The ASIC temperature range 336 maps to various temperature ranges of the ASIC 226 that may be measured by temperature sensor 227 of FIG. 2.

The optimized re-driver equalizer setting 338 of table 300 represents various setting values, as shown ranging from 1 to 16, that correspond to operational values with respect to columns 330, 332, 334, 336. In embodiments, the controller 204, depending upon the current operational values, will transmit one of the optimized re-driver equalizer setting values to the re-driver 202. The re-driver 202 will store this information, and then alter its equalizer behavior as it applies equalizations between one high-speed link 208, 212 and another high-speed link 212, 208. As operational conditions, in particular temperatures of components of the server system 200, change, this may cause a different re-driver equalizer setting value 338 to be transmitted by the controller 204 to the re-driver 202.

For example, using table 300, the re-driver 200 may have a default optimized re-driver equalizer setting 338 value of 1. This means that with respect to the server system 200 of FIG. 2, the re-driver silicon corner 330 is "slow", the Inlet airflow temperature range 334 is between 20-40° C., the ASIC temperature range 336 is between 30-70° C. After some operation, the CPU temperature range 332 may rise to 90° C., which is between 80-100° C., with all other values constant. The controller 204 with then identify the value ranges to correspond with setting value 2, corresponding to row 340 of table 300. The controller 204 within transmit the re-driver equalizer setting "2" via the bus 206 to the re-driver 202. The re-driver 202 within changes operational characteristics to conform to a re-driver equalizer setting of 2. In embodiments, each re-driver equalizer setting value of table 300 is mapped to various temperature ranges of various temperature sensors such as temperature sensors 109, 227, 231 of FIG. 2.

Figure 4:
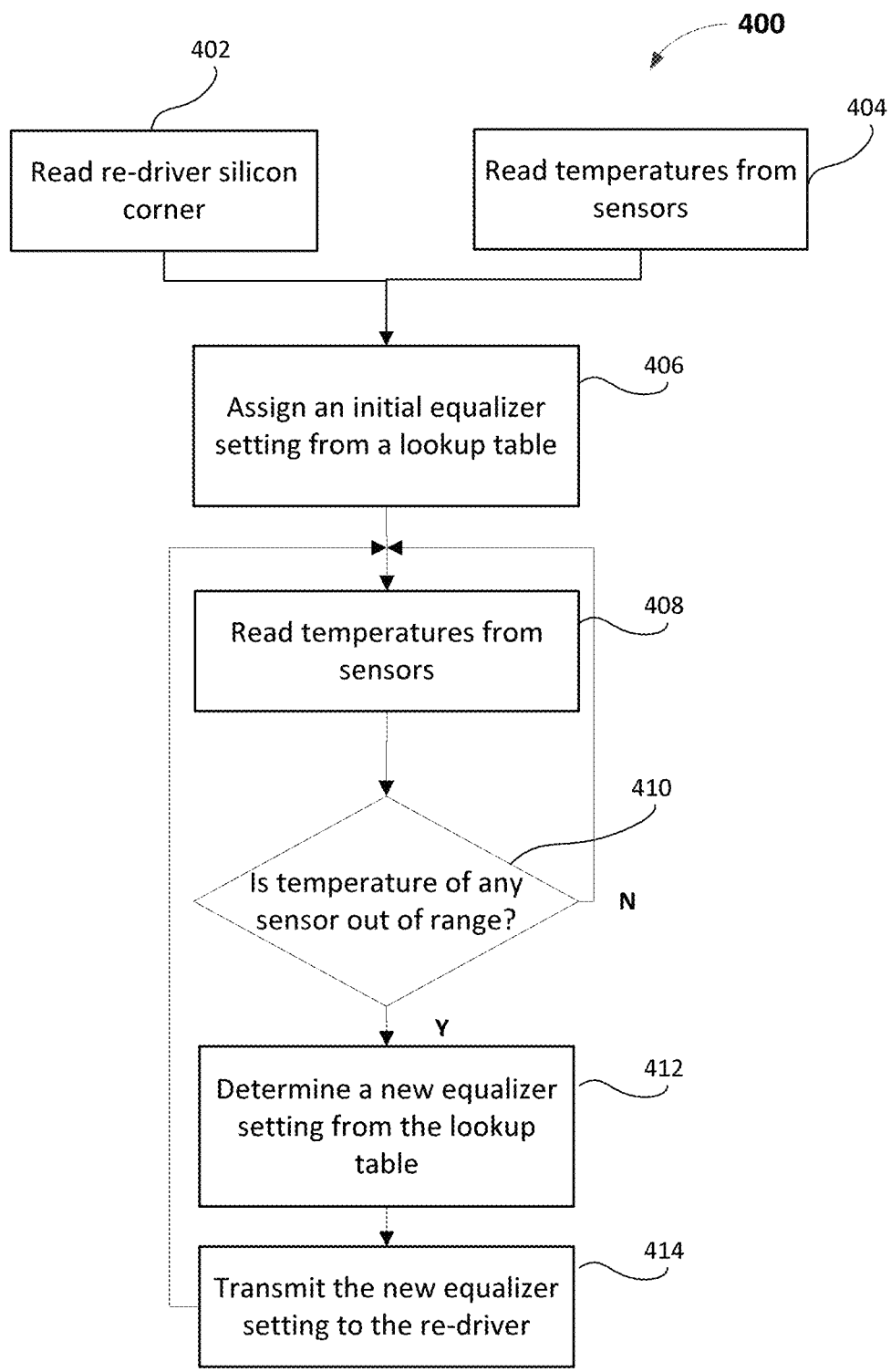
FIG. 4 depicts an example operation flow/algorithmic structure of a controller, in accordance with various embodiments.

FIG. 4 depicts an example operation flow/algorithmic structure of a controller, in accordance with various embodiments. Process 400 may be implemented by one or more elements as shown with respect to FIGS. 1-3 to implement a controller such as controller 104 of FIG. 1, and controller 204 of FIG. 2. In embodiments, process 400 may be implemented entirely or in part by a re-driver equalizer settings module 518 of FIG. 5.

At block 402, the process may read a re-driver silicon corner. In embodiments, the re-driver silicon corner may be read by querying, through control bus 106, a re-driver silicon corner value that may be stored within the re-driver 102. In embodiments, this re-driver silicon corner value may be stored in a register (not shown) within the re-driver 102. In other embodiments, the silicon corner may be received from some other source external to the re-driver 102.

At block 404, the process may read temperatures from sensors. In embodiments, the sensors may include temperature sensors 116, 118 shown in FIG. 1, or temperature sensors 209, 231, 227 shown in FIG. 2. In embodiments, the placement of the temperature sensors are determined based upon heat sources within a device with varying temperatures during operation that may affect the operation of the re-driver 202.

At block 406, the process may assign an initial equalizer setting from a lookup table. In embodiments, the lookup table may be similar to mapping table 105 within controller 104 of FIG. 1, and may have contents similar in structure to table 300 of FIG. 3. In embodiments, the information gathered from block 402 and block 404 are used to identify a optimized re-driver equalizer setting 338 of FIG. 3. In embodiments, this initial equalizer setting value may be transmitted to the re-driver 102 via the control bus 106 of FIG. 1. This initial equalizer setting value may be stored as the re-driver equalizer setting 103 that is stored within the re-driver 102 of FIG. 1.

At block 408, the process may read temperature from sensors. This block may be similar to block 404 described above.

At block 410, a determination is made of whether a temperature of any sensor is out of range. In embodiments, the range values within table 300 for a particular re-driver equalizer setting value, for example row 340 of FIG. 3, may be compared, respectively, from the corresponding read temperatures from block 408. If the read temperatures all fall within the ranges for the current re-driver equalizer setting, then control is passed back to block 408.

Otherwise, at block 412, the process may determine a new equalizer setting from the lookup table. In embodiments, the process may search for a new re-driver equalizer setting where the read temperatures all fall within the ranges for the new re-driver equalizer setting.

At block 414, the process may transmit the new equalizer setting to the re-driver. In embodiments, the determined new equalizer setting will be transmitted via the control bus 106 of FIG. 1 or control bus 206 of FIG. 2, to the re-driver 102, 202. Control may then pass to block 408.

During operation, channel loss, in decibels, may increase as temperature of various components surrounding the high-speed link 208, 212 and the re-driver 202 of FIG. 2, increase. This increase may be in an approximately linear manner. In operational embodiments, a slope of the loss versus temperature graph may depend on materials used in the various components, but may be primarily determined by a change in the conductivity of copper conductors and the loss tangent of laminate dielectrics in the high-speed links 208, 212 as well as other components within the server system shown as diagram 200 and FIG. 2. The construction of a mapping table 105 of FIG. 1, and the table 300 of FIG. 3, may be developed using knowledge of the loss versus temperature gradient and the expected range of temperatures during operation of the server system 200.

Figure 5:
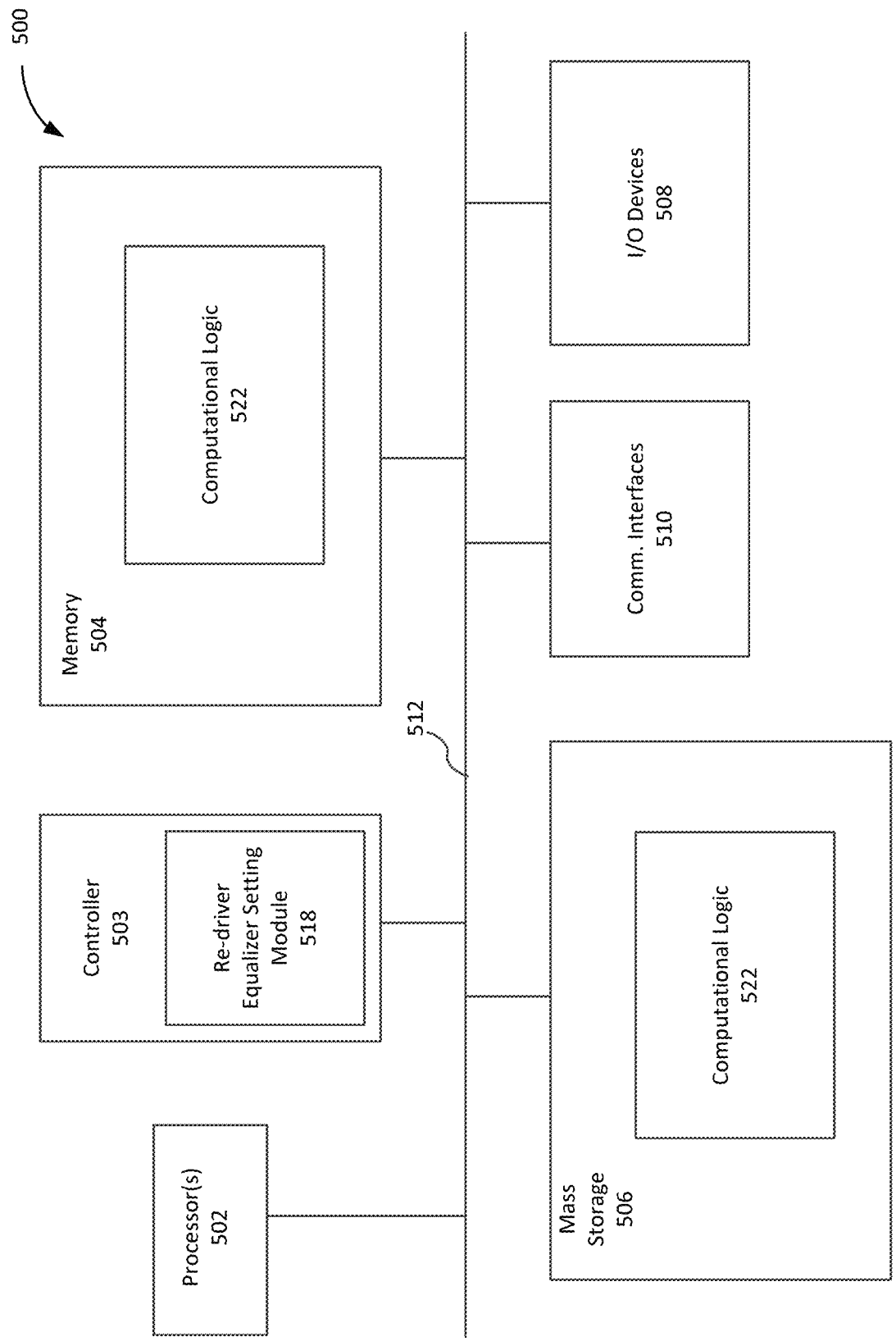
FIG. 5 illustrates an example computing device 500 suitable for use with various components of FIGS. 1-4, in accordance with various embodiments.

FIG. 5 illustrates an example computing device 500 suitable for use with various components described or referred to in FIGS. 1-4, in accordance with various embodiments.

For example, the computing device 500 may include a controller 503, which may be a controller 104 of FIG. 1, or 204 of FIG. 2. Controller 503 may include Re-driver Equalizer Setting Module 518, incorporated with the teachings of the present disclosure earlier described with references to FIG. 1-4. As shown, computing device 500 may further include one or more processors or processor cores 502 and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor.

The computing device 500 may include mass storage devices 506 (such as diskette, hard drive, volatile memory (e.g., dynamic random-access memory (DRAM), compact disc read-only memory (CD-ROM), digital versatile disk (DVD), and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 500 may further include I/O devices 508 (such as a display (e.g., a touchscreen display)), keyboard, cursor control, remote control, gaming controller, image capture device, a camera, one or more sensors, and so forth) and communication interfaces 510 (such as network interface cards, modems, infrared receivers, I2C buses, radio receivers (e.g., Bluetooth), and so forth).

The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

The above-described computing device 500 elements may be coupled to each other via system bus 512, which may represent one or more buses, and which may include, for example, control bus 106, or I2C bus 215. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions for the operation of various components of computing device 500, including but not limited to an operating system of computing device 500 and/or one or more applications, collectively denoted as computational logic 522. In some embodiments, computational logic 522 may include some of the logic to implement Re-driver Equalizer Setting Module 518. Computational logic 522 may be implemented by assembler instructions supported by processor(s) 502 or high-level languages that may be compiled into such instructions.

The permanent copy of the programming instructions may be placed into mass storage devices 506 in the factory, or in the field through, for example, a distribution medium (not shown), such as a compact disc (CD), or through communication interface 510 (from a distribution server (not shown)). That is, one or more distribution media having an implementation of the agent program may be employed to distribute the agent and to program various computing devices.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 504 may include computational logic 522 configured to implement various firmware and/or software services associated with operations of the computing device 500. For some embodiments, at least one of processors 502 may be packaged together with computational logic 522 configured to practice aspects of embodiments described herein to form a System in Package (SiP) or a System on Chip (SoC).

In various implementations, the computing device 500 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 500 may be any other electronic device that processes data.

Figure 6:
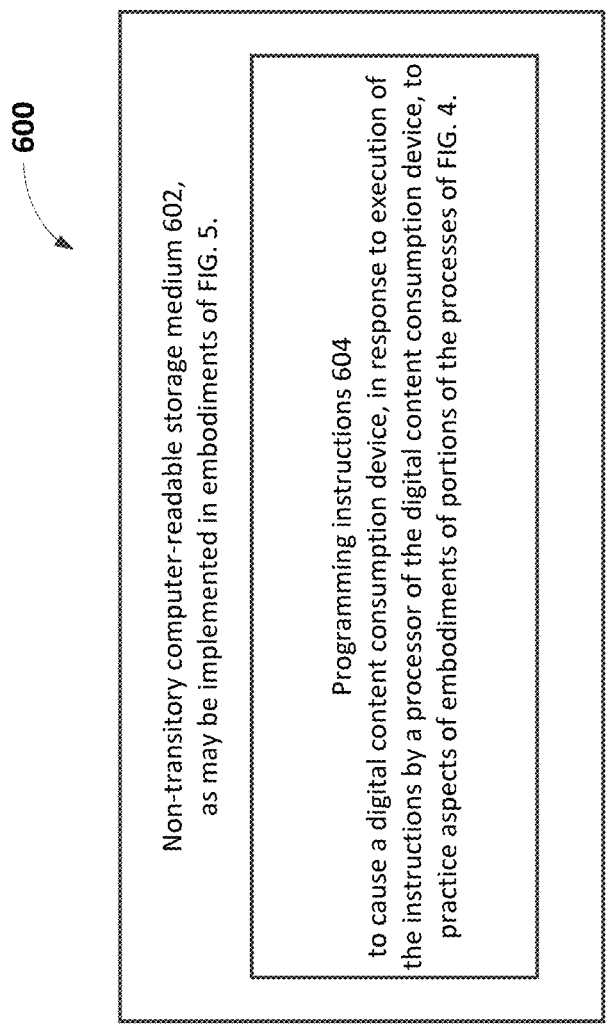
FIG. 6 depicts a computer-readable storage medium that may be used in conjunction with the computing device 500, in accordance with various embodiments.

FIG. 6 depicts a computer-readable storage medium that may be used in conjunction with the computing device 500, in accordance with various embodiments. Diagram 600 illustrates an example non-transitory computer-readable storage media 602 having instructions configured to practice all or selected ones of the operations associated with the processes described above. As illustrated, non-transitory computer-readable storage medium 602 may include a number of programming instructions 604 (e.g., including re-driver equalizer settings module 518). Programming instructions 604 may be configured to enable a device, e.g., computing device 500, in response to execution of the programming instructions, to perform one or more operations of the processes described in reference to FIGS. 1-4. In alternate embodiments, programming instructions 604 may be disposed on multiple non-transitory computer-readable storage media 602 instead. In still other embodiments, programming instructions 604 may be encoded in transitory computer-readable signals.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples are provided below.

EXAMPLES

Example 1 is a re-driver device, comprising: an input port to receive a first signal; an output port to transmit a second signal; a controller port to couple the re-driver device with a controller device external to the re-driver device; and circuitry coupled to the input port, the output port and the controller port, to: receive, from the controller device via the controller port, an indication of one of a plurality of re-driver equalizer settings; and based upon the received indication of the one of the plurality of re-driver equalizer settings, identify an equalization to be applied to the received first signal to generate the second signal to be transmitted, wherein the identified equalization to be applied is to compensate for channel loss conditions associated with receiving the first signal.

Example 2 may include the re-driver device of example 1, wherein the circuitry is further to: apply the identified equalization to the first signal to generate the second signal; and transmit the generated second signal via the output port.

Example 3 may include the re-driver device of example 1, wherein to receive the indication of the one of the plurality of re-driver equalizer settings further includes to store the received indication in a read/write register in the circuitry.

Example 4 may include the re-driver device of claim 1, wherein the controller port is coupled with the external controller device via an interconnect of a computing platform having the external controller, the control bus, and the re-driver device.

Example 5 may include the re-driver device of example 4, wherein the interconnect is an Inter-Integrated Circuit (I2C)

bus, a Serial Peripheral Interface (SPI), or an Universal Asynchronous Receiver-Transmitter (UART) circuit.

Example 6 may include the re-driver device of any one of examples 1-5, wherein the input port is coupled with a first high-speed link external to the re-driver device, and the output port is coupled with a second high-speed link external to the re-driver device.

Example 7 may include the re-driver device of any one of examples 1-5, wherein the circuitry further includes a register to store an attribute of the re-driver device.

Example 8 may include the re-driver device of example 7, wherein the attribute includes information related to a silicon corner of the re-driver device.

Example 9 may include a controller, comprising: one or more sensor ports to couple with one or more sensor devices external to the controller; a re-driver port to couple with a re-driver device external to the controller; and circuitry coupled with the one or more sensor ports and the re-driver port to: receive, from the one or more sensor devices via the one or more sensor ports, operational data; and identify, based on the received operational data, an indication of a re-driver equalizer setting to be transmitted to the re-driver device.

Example 10 may include the controller of example 9, wherein the circuitry is further to transmit the identified indication of the re-driver equalizer setting to the re-driver device via the re-driver port.

Example 11 may include the controller of example 9, wherein the circuitry is further to receive, from the re-driver device, an attribute of the re-driver device, and wherein the operational data further includes the attribute of the re-driver device.

Example 12 may include the controller of example 11, wherein the attribute of the re-driver device is a silicon corner of the re-driver device.

Example 13 may include the controller of example 9, wherein the circuitry is further to store a plurality of indications of re-driver equalizer settings associated, respectively, with a plurality of attributes, each attribute with an associated data value.

Example 14 may include the controller of example 13, wherein the plurality of attributes correspond, respectively, with the one or more sensor devices or with a silicon corner of the re-driver device.

Example 15 may include the controller of example 14, wherein to identify, based on the received operational data, the indication of the re-driver equalizer setting to be transmitted to the re-driver device, further includes to: compare the operational data to the data values, respectively, of the plurality of attributes; and identify, based on the comparison, an indication of a re-driver equalizer setting to be transmitted to the re-driver device.

Example 16 may include the controller of example 13, wherein the plurality of attributes includes a plurality of: a temperature range of a component of a system, a temperature range for an inlet of an air flow, a temperature range for an Application Specific Integrated Circuit (ASIC), or an indication of the silicon corner of the re-driver device.

Example 17 may include the controller of any one of examples 9-16, wherein the controller is implemented in a selected one of: a Baseboard Management Controller (BMC), a Field Programmable Gate Array (FPGA), or a Complex Programmable Logic Device (CPLD).

Example 18 may include the controller of any one of claims 9-16, wherein the circuitry includes: a processor; a memory coupled with the processor to store instructions, that when executed by the processor, cause the processor to perform the receive and identification operations of the circuitry.

Example 19 may include a method for automatically adjusting a re-driver device, the method comprising: receiving, by a controller, an operational datum from a sensor device; determining, by the controller, whether the received operational datum is outside a data value range associated with the sensor device for a currently indicated equalizer setting of a re-driver device associated with the sensor device; upon the determination, identifying, by the controller, an indication of another equalizer setting for which the operational datum is within the data value range for the another equalizer setting of the re-driver device; and transmitting, by the controller, the indication of the another equalizer setting to the re-driver to adjust the re-driver device.

Example 20 may include the method of example 20, wherein the operational datum from the sensor device is a temperature from a temperature sensor device.

Example 21 may include the method of example 20, wherein the operational datum further includes operational datum indicating a silicon corner of the re-driver.

Example 22 may include the method of any one of examples 20-21, wherein determining whether the received operational datum is outside a data value range associated with the sensor device for the indicated equalizer setting further includes: identifying, by the controller, a table of re-driver equalizer settings with each row of the table associated with a different equalizer setting; and identifying, by the controller, in a row associated with the currently indicated equalizer setting, the data value range associated with the sensor device.

Example 23 may include the method of example 22, further comprising storing the table in the controller.

We claim:
1. A re-driver device, comprising:
an input port to receive a first signal;
an output port to transmit a second signal;
a controller port to couple the re-driver device with a controller device external to the re-driver device; and
circuitry coupled to the input port, the output port, and the controller port, to:
receive, from the controller device via the controller port, an indication of one of a plurality of re-driver equalizer settings; and
based upon the received indication of the one of the plurality of re-driver equalizer settings, identify an equalization to be applied to the received first signal to generate the second signal to be transmitted, wherein the identified equalization to be applied is to compensate for channel loss conditions associated with receiving the first signal.

2. The re-driver device of claim 1, wherein the circuitry is further to:
apply the identified equalization to the first signal to generate the second signal; and
transmit the generated second signal via the output port.

3. The re-driver device of claim 1, wherein to receive the indication of the one of the plurality of re-driver equalizer settings further includes to store the received indication in a read/write register in the circuitry.

4. The re-driver device of claim 1, wherein the controller port is coupled with the external controller device via an interconnect of a computing platform having the external controller, a control bus, and the re-driver device.

5. The re-driver device of claim 4, wherein the interconnect is an Inter-Integrated Circuit (I2C) bus, a Serial Peripheral Interface (SPI), or a Universal Asynchronous Receiver-Transmitter (UART) circuit.

6. The re-driver device of claim 1, wherein the input port is coupled with a first high-speed link external to the re-driver device, and the output port is coupled with a second high-speed link external to the re-driver device.

7. The re-driver device of claim 1, wherein the circuitry further includes a register to store an attribute of the re-driver device.

8. A controller, comprising:
one or more sensor ports to couple with one or more sensor devices external to the controller;
a re-driver port to couple with a re-driver device external to the controller; and
circuitry coupled with the one or more sensor ports and the re-driver port to:
identify operational data received from the one or more sensor devices via the one or more sensor ports;
determine that the received operational data is outside a data value range associated with a currently indicated equalizer setting of a re-driver device;
identify, based on the received operational data, a second equalizer setting for which the operational data is within a data value range associated with the second equalizer; and
transmit an indication of the second equalizer setting to the re-driver device.

9. The controller of claim 8, wherein the circuitry is further to receive, from the re-driver device, an attribute of the re-driver device, and wherein the operational data further includes the attribute of the re-driver device.

10. The controller of claim 9, wherein the attribute of the re-driver device is a silicon corner of the re-driver device.

11. The controller of claim 8, wherein the circuitry is further to store a plurality of indications of re-driver equalizer settings associated, respectively, with a plurality of attributes, each attribute with an associated data value.

12. The controller of claim 11, wherein the plurality of attributes correspond, respectively, with the one or more sensor devices or with a silicon corner of the re-driver device.

13. The controller of claim 12, wherein to identify, based on the received operational data, the indication of the re-driver equalizer setting to be transmitted to the re-driver device, further includes to:
compare the operational data to the data values, respectively, of the plurality of attributes; and
identify, based on the comparison, an indication of a re-driver equalizer setting to be transmitted to the re-driver device.

14. The controller of claim 11, wherein the plurality of attributes includes a plurality of: a temperature range of a component of a system, a temperature range for an inlet of an air flow, a temperature range for an Application Specific Integrated Circuit (ASIC), or an indication of a silicon corner of the re-driver device.

15. The controller of claim 8, wherein the controller is implemented in a selected one of: a Baseboard Management Controller (BMC), a Field Programmable Gate Array (FPGA), or a Complex Programmable Logic Device (CPLD).

16. A method for automatically adjusting a re-driver device, the method comprising:
receiving, by a controller, an operational datum from a sensor device;
determining, by the controller, whether the received operational datum is outside a data value range associated with the sensor device for a currently indicated equalizer setting of a re-driver device associated with the sensor device;
upon the determination, identifying, by the controller, an indication of another equalizer setting for which the operational datum is within the data value range for the another equalizer setting of the re-driver device; and
transmitting, by the controller, the indication of the another equalizer setting to the re-driver device to adjust the re-driver device.

17. The method of claim 16, wherein the operational datum from the sensor device is a temperature from a temperature sensor device.

18. The method of claim 16, wherein the operational datum further includes an operational datum indicating a silicon corner of the re-driver device.

19. The method of claim 16, wherein determining whether the received operational datum is outside a data value range associated with the sensor device for the indicated equalizer setting further includes:
identifying, by the controller, a table of re-driver equalizer settings with each row of the table associated with a different equalizer setting; and
identifying, by the controller, in a row associated with the currently indicated equalizer setting, the data value range associated with the sensor device.

* * * * *